United States Patent [19]

Terawaki

[11] Patent Number: 5,799,135
[45] Date of Patent: Aug. 25, 1998

[54] ROBOT CONTROLLING METHOD AND APPARATUS USING LASER SENSOR

[75] Inventor: Fumikazu Terawaki, Yamanashi, Japan

[73] Assignee: Fanuc, Ltd., Minamitsuru-gun, Japan

[21] Appl. No.: 493,618

[22] Filed: Jun. 22, 1995

[30] Foreign Application Priority Data

Jun. 28, 1994 [JP] Japan ................. 6-167551

[51] Int. Cl.$^6$ ................................... G06F 15/18
[52] U.S. Cl. ................................... 395/93
[58] Field of Search ................. 395/93, 94, 88, 395/89; 219/124.35, 125.1, 121.6; 250/559; 228/102; 318/568.22; 356/5.01; 364/571.01

[56] References Cited

U.S. PATENT DOCUMENTS

| | | | |
|---|---|---|---|
| 4,448,342 | 5/1984 | Abe et al. | 228/102 |
| 4,508,953 | 4/1985 | Murakami et al. | 219/125.1 |
| 4,639,878 | 1/1987 | Day et al. | 395/94 |
| 4,673,795 | 6/1987 | Ortiz, Jr. | 219/121.6 |
| 4,742,207 | 5/1988 | Nakashima et al. | 219/125.1 |
| 4,831,316 | 5/1989 | Ishiguro et al. | 395/89 |
| 4,874,238 | 10/1989 | Ochi et al. | 356/3.12 |
| 4,894,597 | 1/1990 | Ohtomi | 318/568.22 |
| 5,006,999 | 4/1991 | Kuno et al. | 395/88 |
| 5,032,775 | 7/1991 | Mizuno et al. | 701/25 |
| 5,074,673 | 12/1991 | Sowell et al. | 356/5.01 |
| 5,173,592 | 12/1992 | Okumura et al. | 219/125.1 |
| 5,399,870 | 3/1995 | Torii et al. | 250/559.29 |
| 5,467,003 | 11/1995 | Kosaka et al. | 318/568.13 |
| 5,511,007 | 4/1996 | Nihei et al. | 364/571.01 |
| 5,582,750 | 12/1996 | Hamura et al. | 219/124.34 |

Primary Examiner—Robert W. Downs
Assistant Examiner—Sanjiu Shah
Attorney, Agent, or Firm—Staas & Halsey

[57] ABSTRACT

A robot controlling method and apparatus using a laser sensor in which an optimum moving path is realized even if the accuracy of positioning workpieces is low. While a laser sensor is operated, a robot is started to move toward a taught position corresponding to the start position of a welding line. When the workpieces W1 and W2 are detected, a three-dimensional position of the points Q1–Q4 are calculated. The equations of a straight line Q1Q2 and a straight line Q3Q4 are obtained from position data of points Q1–Q4, and a corner position Q0 is calculated as a crossing point of these two straight lines. Then, access is made to a register, which is designated by an address designation counter value i, to read position shift data. When i=1, Δx=Δy=Δ is read and a position shifted from the position Q0 by Δ respectively along the straight lines Q1Q2 and Q3Q4 is calculated as a target position to which the robot movement is performed. In the first moving cycle for forming the first welding layer, a path a is realized. Likewise, in the subsequent moving cycles, different position shift data are read to realize the paths a–f successively.

11 Claims, 5 Drawing Sheets

FIG. 6 he present invention relates to a method apparatus of controlling an industrial robot for use in a factory or a production line by determining a robot moving path, and more particularly, to a method of controlling the robot by obtaining position information of a workpiece using a laser sensor to make a modification to a taught path on the basis of the obtained position information.

ROBOT CONTROLLING METHOD AND APPARATUS USING LASER SENSOR

BACKGROUND OF THE INVENTION

1. Field of the Invention

The present invention relates to a method apparatus of controlling an industrial robot for use in a factory or a production line by determining a robot moving path, and more particularly, to a method of controlling the robot by obtaining position information of a workpiece using a laser sensor to make a modification to a taught path on the basis of the obtained position information.

2. Description of the Related Art

Technology is already known for realizing a desired path of a robot movement by consecutively detecting a position of an operation line, such as a welding line, during a playback operation of an operation program using a laser sensor mounted on the robot and having a sensing area in the vicinity of a tool in the movement direction of the tool, and moving the robot with a correction of a taught path based on the result of detection. This method of correcting the taught path using a laser sensor allows the robot to trace the operating position detected by the laser sensor even if the individual workpiece is not accurately positioned, providing a very useful technology to a welding robot and the like.

However, in the technologies proposed by now, only a single robot moving path (e.g., a welding line) is determined based on the output of the laser sensor. That is, the degree of freedom is low in determining the robot moving path based on the output of the laser sensor and the target position of the robot movement is not determined according to the designation by the operation program. Accordingly, with the conventional technology, it is difficult to modify the taught path so as to execute a multi-layer welding operation by shifting the moving path in parallel for each moving cycle for forming each layer.

SUMMARY OF THE INVENTION

It is an object of the invention to improve the operativity of a robot system by giving a high degree of freedom to a procedure of obtaining a target position of the robot movement based on the output of a laser sensor and making a designation dependent on such a degree of freedom by an operation program.

The invention also provides a method of controlling a welding robot for performing the multi-layer welding on a workpiece by parallelly shifting a robot moving path by a desired amount for each moving cycle for forming each layer.

According to the invention, there is provided a method of controlling a robot by consecutively modifying a taught path designated by an operation program, using an output from a laser sensor which has a sensing area in the vicinity of and in a moving direction of a tool mounted on the robot, the method comprising the steps of: obtaining data representing a position of a workpiece by the laser sensor during a playback operation of the operation program to operate the robot; calculating a reference position for determining a target position for the robot movement based on the obtained data; determining a shift direction and a shift amount with respect to the reference position in accordance with a position shift pattern designated by the operation program; calculating the target position by shifting the reference position in the shift direction by the shift amount; and modifying the taught path based on the determined target position, wherein the above steps are periodically executed Preferably, the step of determining the shift direction and the shift amount includes a step of reading data stored in a position shift pattern register designated by the operation program from position shift pattern registers for storing the shift direction and the shift amount with respect to the reference position.

Especially in controlling a welding robot for performing multi-layer welding on a workpiece by repeatedly executing a moving cycle of a welding torch while consecutively modifying a taught path, the step of determining the shift direction and the shift amount includes a step of reading data stored in a position shift pattern register designated by the operation program from position shift pattern registers for storing the shift direction and the shift amount with respect to the reference position, in dependence upon the current moving cycle of the welding torch for the corresponding layer of the multi-layer welding.

DETAILED DESCRIPTION OF THE PREFERRED EMBODIMENT

Figure 1:
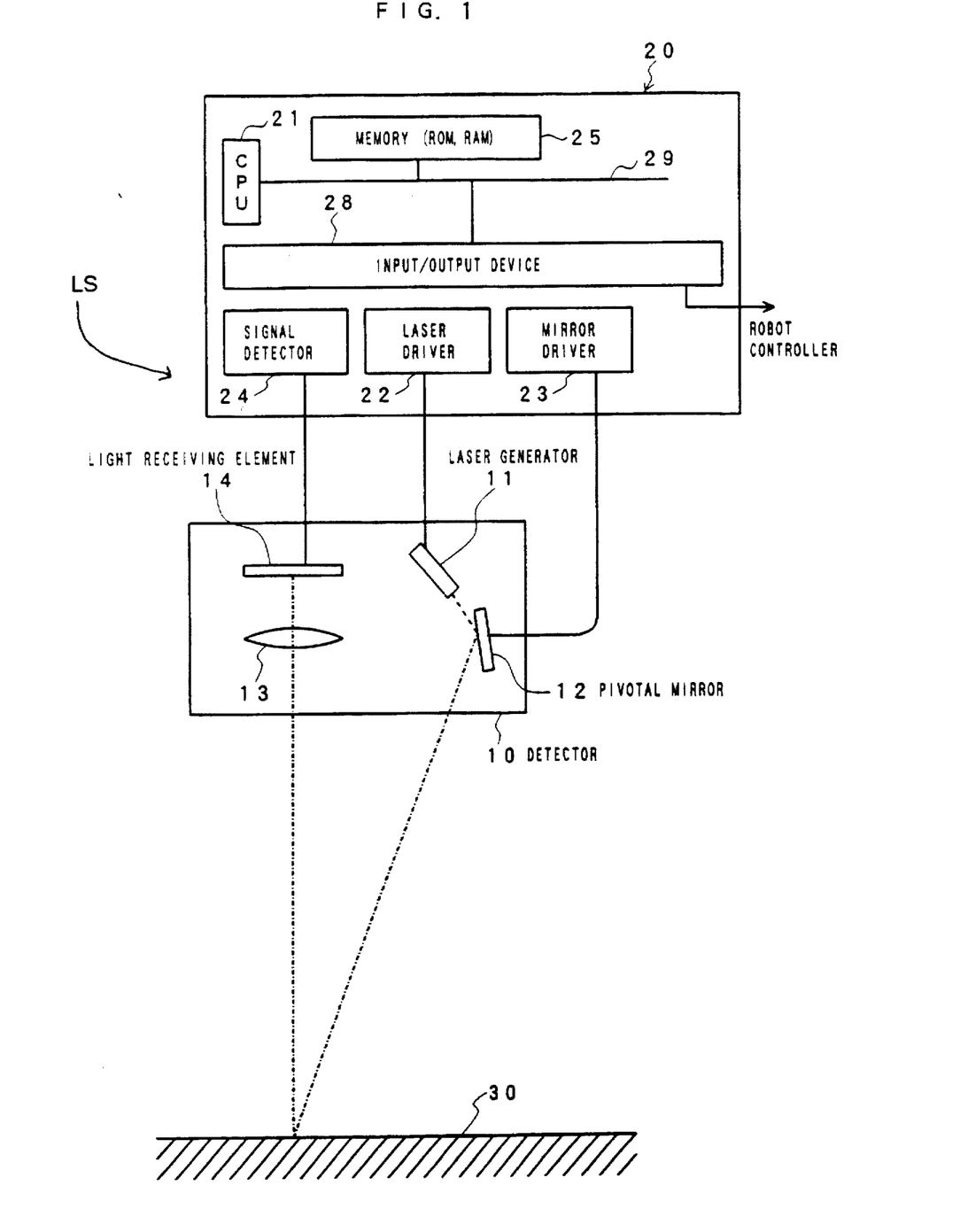
FIG. 1 is a schematic diagram showing a laser sensor to be used for carrying out the invention.

In FIG. 1, a laser sensor LS forms a row of light spots on a surface of an object (a workpiece) by deflecting and scanning a laser beam to form images of the light spots on a light detecting device to obtain three-dimensional position information concerning a light spot or a row of light spots. A detector 10 comprises a laser generator 11, a pivotal mirror (galvanometer) 12 for scanning a laser beam, and an optical system 13 for catching reflected light to form an image on a light receiving element 14. A controller 20 on a sensor board comprises a CPU 21 of a microprocessor. An input/output device 28 and a memory 25 in the form of ROM and RAM are connected to the CPU 21 via a bus 29. A laser driver 22 for driving the laser generator 11 to generate a laser beam, a mirror driver 23 for driving the pivotal mirror 12 to swing, and a signal detector 24 for detecting a workpiece position from the position at which a laser beam is received by the light receiving element 14 are connected to the input/output device 28. The input/output device 28 is connected to a line 40 for transferring various commands and data with a robot controller (not shown).

Upon receipt of a laser sensor start command from the robot controller, a laser sensor driving program stored in the memory 25 is started, and the CPU 21 sends a laser drive command to the laser driver 22 to drive the laser generator 11 to generate a laser beam. The CPU 21 also sends a mirror drive command to the mirror driver 23 to swing the pivotal mirror 12 to scan the laser beam from the laser generator 11 on a workpiece 30.

The laser beam diffused and reflected by the workpiece 30 forms an image on the light receiving element 14 at a position in dependence on the position of reflection on the workpiece by the optical system 13. The light receiving element 14 may be a CCD (Charge Coupled Device), which is a split-type element, or a PSD (Position Sensitive Detector), which is a nonsplit-type integrating element.

In the illustrated embodiment, a one-dimensional CCD array of the laser sensor is used as the light receiving element 14. The light (the image of the light spot) struck upon the light-receiving surface of the light receiving element 14 is converted into optoelectrons and stored in its cell. The electric charges charged in the cell are outputted successively from the utmost end in every predetermined cycle in accordance with CCD scanning signals from a signal detector 24, and the newest data is stored in the memory 25 via the signal detector 24 and the input/output device 28 as processed by analog-to-digital conversion.

The scanning cycle of the CCD is set to be adequately shorter (e.g. a several-hundredth) than the scanning cycle of the pivotal mirror 12, and any change both in angular movement of the pivotal mirror 12 and in the status of output of the CCD element can be grasped at all times. The status of output of the CCD element is grasped in terms of cell position (cell number) of maximum output so that a cell position struck by the reflected light can be detected. From this cell position, the position of a workpiece 30 with respect to the sensor is calculated.

Figure 2:
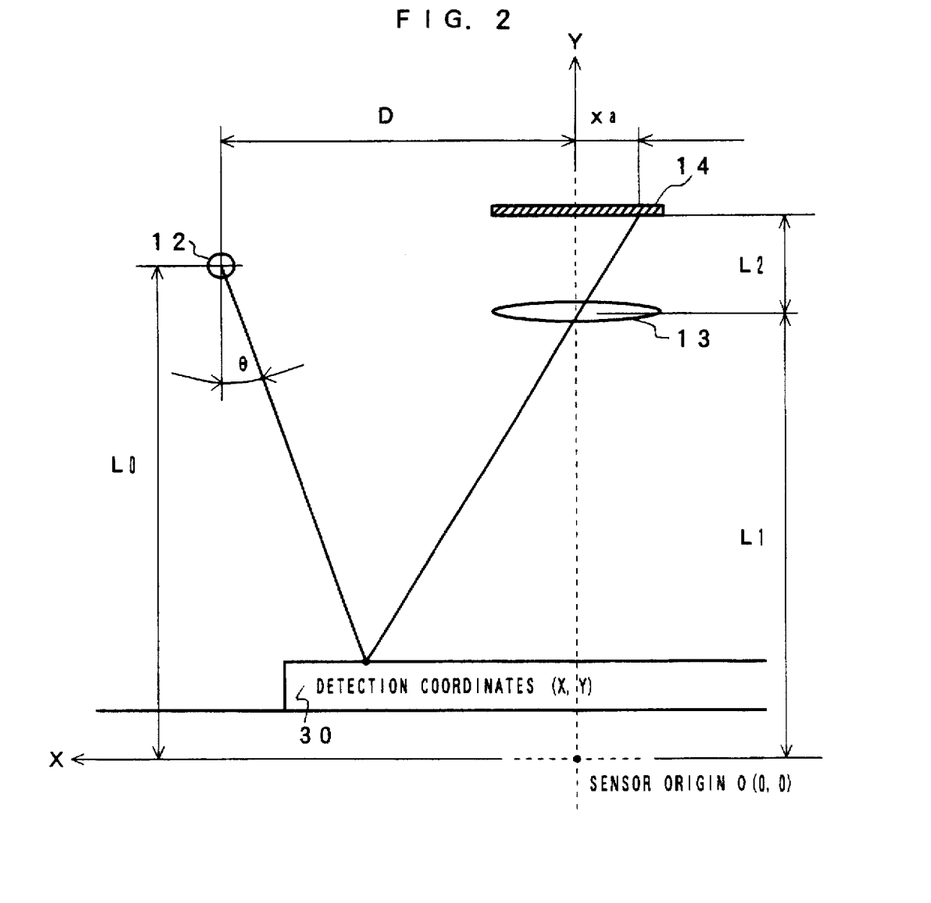
FIG. 2 is a schematic diagram of assistance in explaining a method of obtaining a coordinate position of an object from a light spot detected by a light receiving element of the laser sensor.

FIG. 2 shows a way to obtain the coordinate position (X, Y) of a workpiece with respect to the sensor from the position xa of the image on the light receiving element 14. An origin O (0, 0) of the sensor is defined on a straight line connecting a center of the optical system 13 and a center point of the light receiving element 14, the straight line is defined as the Y axis, and a straight line perpendicular to the Y axis is defined as the X axis. A coordinate position (X, Y) at which the laser beam strikes and is reflected on the workpiece 30 is obtained by the following equations (2) and (3):

$$X = xa \cdot [(L1 - L0) \cdot \tan\theta + D]/(xa + L2 \cdot \tan\theta) \quad (2)$$

$$Y = L2 \cdot \{L0 \cdot \tan\theta + xa \cdot (L1/L2) - D\}/(xa + L2 \cdot \tan\theta) = \quad (3)$$

$$[L1 \cdot xa + L2 \cdot (L0 \cdot \tan\theta - D)]/(xa + L2 \cdot \tan\theta)$$

where L1 is a distance from the origin O to the center of the optical system 13, L2 is a distance from the center of the optical system 13 to the center point of the light receiving element 14, D is a distance from the origin O to a pivot point of the pivotal mirror 12 in the direction of the X axis, L0 is a distance from the origin O to the pivot point of the pivotal mirror in the direction of the Y axis, θ is an angle between the reflected light (by the pivotal mirror 12) of the laser beam and the Y axis, and xa is a light receiving position on the light receiving element 14 in the direction of the X axis.

The CPU 21 of the controller 20 starts a position calculating program, which is stored in the memory 25, in response to a command from the robot controller to execute a processing corresponding to the calculation of the equations (2) and (3) at a predetermined period. The result of calculation is transferred to the robot controller. The data transferred to the robot controller is used for calculating a three-dimensional position of the reflected position together with the data of position and posture of the robot, as described below.

The position information concerning the workpiece (e.g., a position of a welding line) calculated from the detection output of the laser sensor is used to correct or modify the taught path of the robot. The target position of movement is univocally determined to be the welding-line position thus calculated in the conventional art. In this invention, however, the welding-line position calculated from the detection output of the laser sensor is not directly used as a target position of movement, but is used as a reference position for modifying the taught path, and then a position shifted from the reference position is determined as a target position of movement.

The direction and amount (distance) of the shifting from the reference position are designated by a predetermined position shift pattern in the operation program. For example, position shift patterns describing position shift directions and amounts are preset in the robot controller, among which the data designated by the operation program is invoked to determine a position shift direction and a position shift amount.

When the method is applied to multi-layer welding using a welding robot, it is possible to determine the position shift direction/amount for each robot moving cycle which corresponds to the first layer, the second layer, . . . , the n-th layer individually, by previously setting the shift direction/amount designated by the operation program in association with the robot moving cycles for performing the welding of the respective layers.

Figure 3:
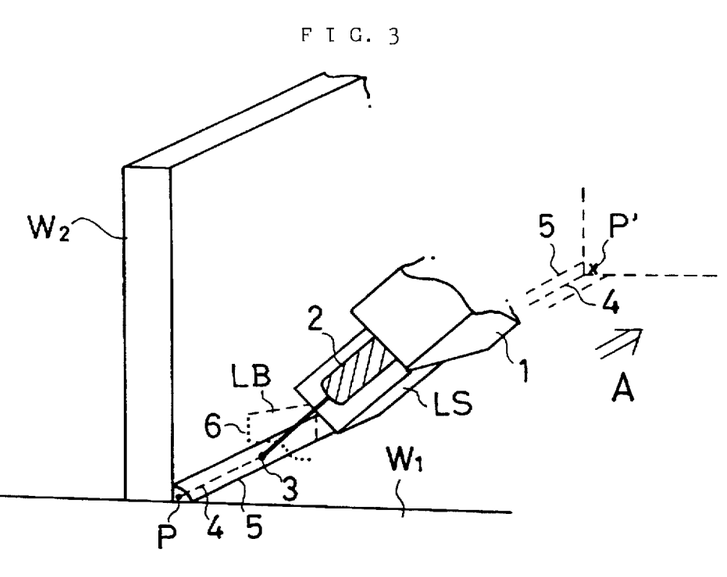
FIG. 3 is a perspective view showing the arrangement when the method of the invention is applied to a fillet multi-layer welding performed by a welding robot.

FIG. 3 shows an example of arrangement of a welding torch and a workpiece when applying the method of the invention to a multi-layer fillet welding with a welding robot.

In FIG. 3, multi-layer welding is performed along a corner line 4 formed between two workpieces W1 and W2 to be welded. A layer 5 is formed by the multi-layer welding.

The welding of the two workpieces W1 and W2 is performed by a welding torch 2 attached to a distal end 1 of a robot arm by a suitable mounting mechanism. A tool center point 3 of the robot is set at the tip of the welding torch 2. The robot is controlled in such a manner that the tool center point 3 is moved to a target position. On the distal end 1 of the robot arm, a laser sensor LS is mounted alongside the welding torch 2 for scanning the laser beam LB astride of the corner line 4. Reference numeral 6 designates a locus of the light spots formed by the laser beam LB.

The welding robot performs the multi-layer welding over the entire corner by repeating a movement of the ignited welding torch 2 along the corner line 4 in the direction of an arrow A from a taught point P in the vicinity of the initial point of the corner to a taught point P' in the vicinity of the end point of the corner a predetermined number of times. The number of moving cycles to be executed is determined by the number of welding layers to be formed.

Figure 5:
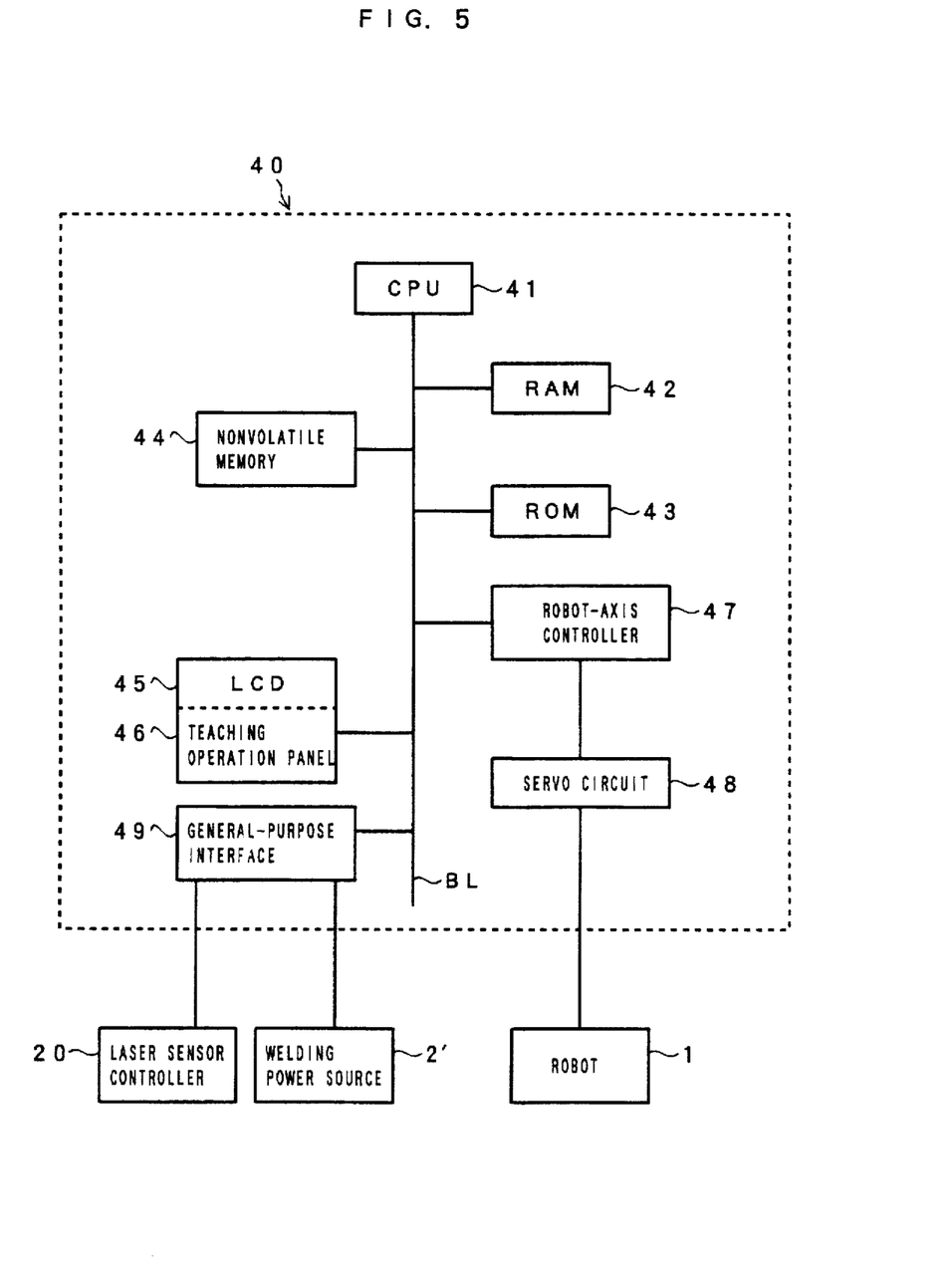
FIG. 5 is a fragmentary block diagram showing a robot system to be used in the invention.

Referring to FIG. 5, the whole system including a robot controller to be used in forming multi-layer welding according to the invention will be described.

The robot controller 40 includes a central processing unit (CPU) 41, which is connected via a bus line BL to a memory 42 in the form of a ROM, a memory 43 in the form of a RAM, a nonvolatile memory 44, a teaching operation panel 46 with a liquid crystal display 46, a robot-axis controller 47 connected to a welding robot 1 via a servo circuit 48, and a general-purpose interface 49 connected to both the controller 20 (FIG. 1) of the laser sensor LS and a welding power source 2'.

In the ROM 42, various kinds of programs for CPU 41 to control the laser sensor controller 20, the welding power source 2' and the robot controller 40 are stored. The RAM 43 is used for temporary storage of data and arithmetic operations of data. In the nonvolatile memory 44, set values for various parameters and robot operation programs are inputted and stored.

The welding path is designated in the operation program by previously teaching the points P and P' to define a "straight line" in FIG. 3 by the teaching/playback method using standard workpieces. Accordingly, the taught path is a straight line passing through the points P and P'. If the workpieces W1 and W2 are identical with the standard workpieces in shape, size and positioning, the taught path substantially coincides with the corner line 4 between the workpieces W1 and W2. If not (for example, in case of inaccurate positioning of the workpieces W1 and W2), there would be a considerable deviation between the taught path and the corner line 4.

With the foregoing premises, hereinafter described is the method for realizing the robot moving path shown in FIG. 4 for each moving cycle according to one embodiment of the present invention.

Figure 4:
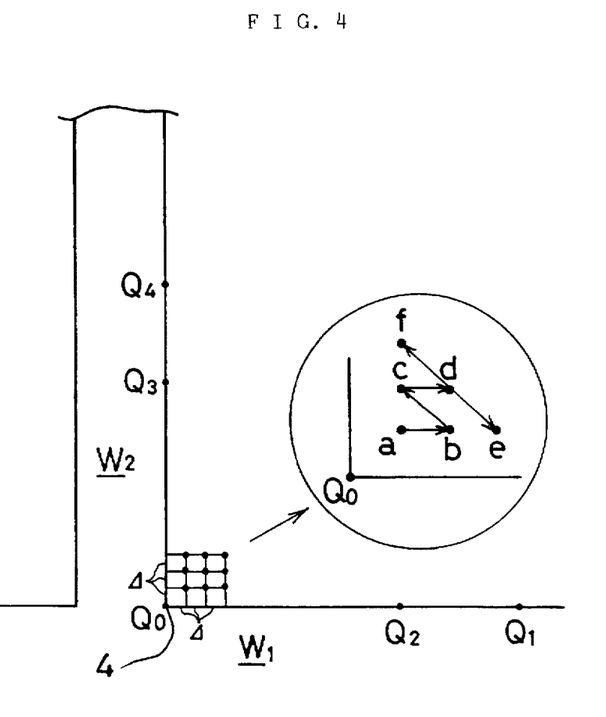
FIG. 4 is a schematic diagram showing the way of determining a robot moving path for each moving cycle according to the invention.

FIG. 4 shows a cross section of the workpieces W1 and W2 as shown in FIG. 3 along the scanning plane of the laser beam LB. The point Q0 represents a position of the corner line 4 on the cross section of the workpieces W1 and W2. The robot moving path for each moving cycle is determined so as to pass through a point shifted a predetermined amount from the point Q0.

In this embodiment, the number N of moving cycles (the number of welding layers) is 6, and the moving paths are realized in the order of a, b, c, d, e and f as shown in an enlarged view in FIG. 4. The movement paths indicated by a–f have the following relationship with the position Q0.

Path a: a path keeping a position shifted by an amount $\Delta$ from the position Q along both the surfaces of the workpieces W1 and W2.

Path b: a path keeping a position shifted from the position Q0 by $2\Delta$ along the surface of the workpiece W1 and $\Delta$ along the surface of the workpiece W2.

Path c: a path keeping a position shifted from the position Q0 by $\Delta$ and $2\Delta$ along the surfaces of the workpieces W1 and W2, respectively.

Path d: a path keeping a position shifted from the position Q0 by $2\Delta$ along both the surfaces of the workpieces W1 and W2.

Path e: a path keeping a position shifted from the position Q0 by $3\Delta$ and $\Delta$ along the surfaces of the workpieces W1 and W2, respectively.

Path f: a path keeping a position shifted from the position Q0 by $\Delta$ and $3\Delta$ along the surfaces of the workpieces W1 and W2, respectively.

In order to realize these paths, preparations of the following items (I)–(III) are made in advance.

(I) As shown in FIG. 4, parameters designating at least two points Q1 and Q2 a suitable distance (so as to keep off any welding layer) apart from the point Q0 on the workpiece W1 and parameters designating at least two points Q3 and Q4 a suitable distance (so as to keep off any welding layer) apart from the point Q0 on the workpiece W2 are previously inputted in the nonvolatile memory 44 of the robot controller 40.

The parameters are exemplified by the time T1, T2, T3 and T4 (T0>T1, T0>T2, T0>T3, T0>T4, where T0 is a scanning cycle) measured from the start point of each scanning cycle of the laser beam LB of the laser sensor.

If T1–T4 are suitably set, it is possible to designate a point of time when the light spot is formed at each position Q1–Q4 in each scanning cycle. By sampling the detection output of the laser sensor at these points of time, it is possible to calculate the light spot coordinates (X, Y) of the points Q1–Q4 on the cross section of the workpieces from the sampled data. Using the data of the light spots and data representing a position of the laser beam scanning surface determined by the robot position at each sampling time, three-dimensional positions of the points Q1–Q4 are obtained. The equation of a straight line Q1Q2 is calculated from the three-dimensional positions of the points Q1 and Q2, and the equation of a straight line Q3Q4 from the three-dimensional positions of the points Q3 and Q4. The point Q on the corner line 4 is calculated as the crossing point of these two straight lines.

(II) In the nonvolatile memory 44 of the robot controller 40, data designating a unit amount $\Delta$ for position shift is stored. The unit amount $\Delta$ is inputted from the teaching operation panel 46 in the units of mm, for example.

(III) Position shift pattern storage registers of the number corresponding to the number N of predetermined moving cycles are set in the nonvolatile memory 44 of the robot controller 40. An address designation counter for designating addresses of each register is set. In the position shift pattern storage register designated by a counter value i (i=1, 2, 3, ..., N), shift amount data ($\Delta x$, $\Delta y$) for shifting along straight lines Q1Q2, Q3Q4 so as to realize the paths a, b, c, d, e and f successively is stored. In the above-mentioned example, the data to be stored in the position shift pattern storage registers designated by the individual address designation counter values i are as follows:

Register designated by i=1: ($\Delta$, $\Delta$) for the path a.
Register designated by i=2: ($2\Delta$, $\Delta$) for the path b.
Register designated by i=3: ($\Delta$, $2\Delta$) for the path c.
Register designated by i=4: ($2\Delta$, $2\Delta$) for the path d.
Register designated by i=5: ($3\Delta$, $\Delta$) for the path e.
Register designated by i=6: ($\Delta$, $3\Delta$) for the path f.

Figure 6:
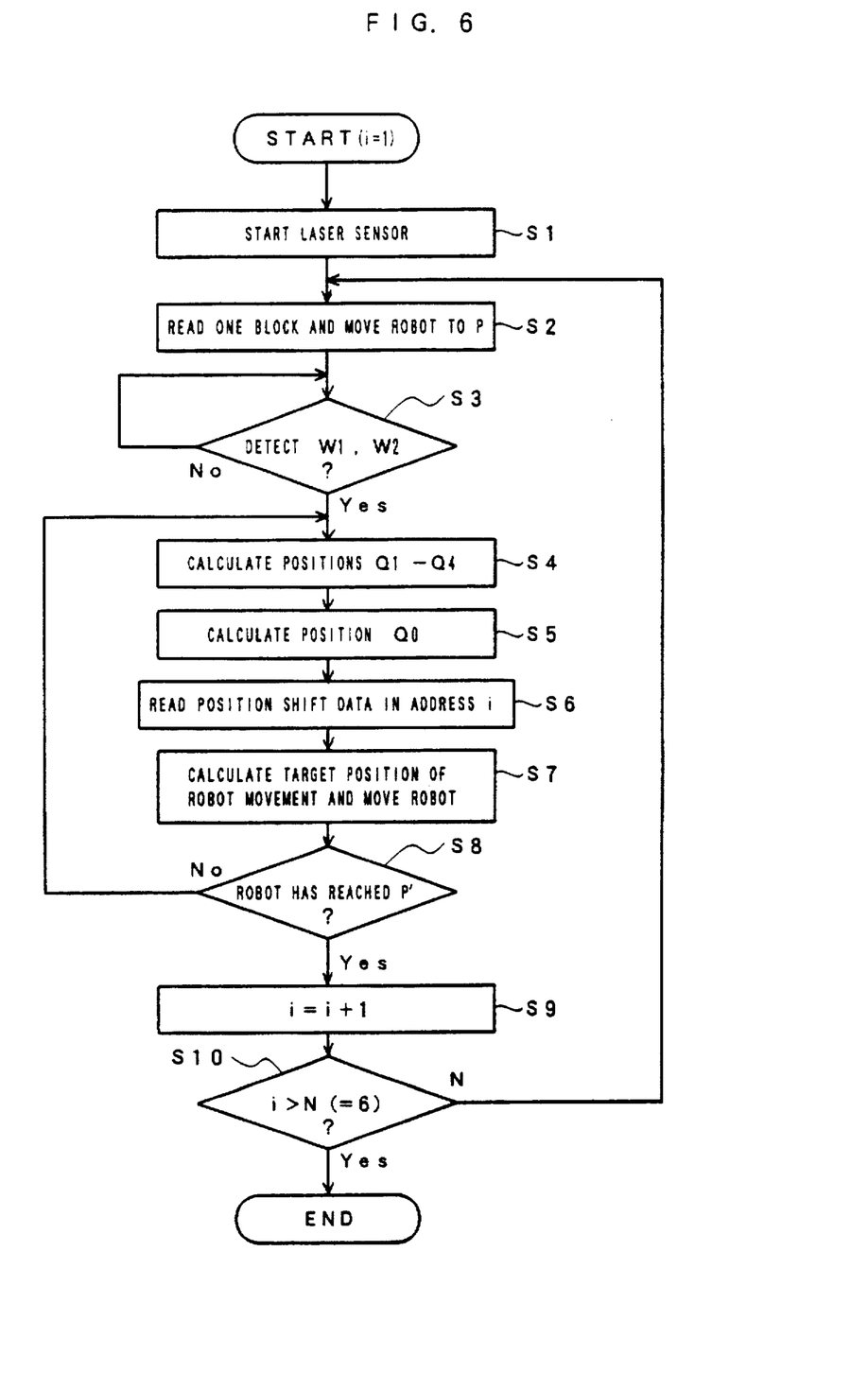
FIG. 6 is a flowchart showing a processing for realizing a robot moving path according to the invention.

Under the foregoing preparations, the processing as shown in the flowchart of FIG. 6 is executed for every predetermined cycle to realize the paths a–f. Only the processing concerning the robot moving path is explained, while explanation of the processing for controlling the welding torch, etc., is omitted.

The processing starts under the condition that the initial value of the address designation counter value i is "1". Firstly, the laser sensor is started (Step S1), and then one block of the operation program is read to start moving the robot toward the taught point P (Step S2). Until the workpieces W1 and W2 are detected by the laser sensor, the movement toward the taught point P is continued (Step S3).

Upon detection of the workpieces W1 and W2, the positions Q1–Q4 are calculated immediately. The calculation of the positions Q1–Q4 is performed based on the laser sensor output at the set times T1–T4. From the laser sensor output, a two-dimensional position as described in connection with FIG. 2 is calculated. Three-dimensional positions of the points Q1–Q4 are obtained based on the two-dimensional position and the position of the laser beam scanning surface calculated from the robot position and posture.

In the next Step S5, the equation of the straight line Q1Q2 is calculated from the position data of the two points Q1 and Q2, and the equation of the straight line Q3Q4 is calculated from the position data of the two points Q3 and Q4. Then, the position Q0 of the corner line is calculated as a crossing position of these two straight lines.

Subsequently, access is made to a register which is designated by the counter value i to read the position shift data (Step S6). When i=1, $\Delta x=\Delta y=\Delta$ is read from the above-mentioned register. In the following Step S7, a position shifted by Δ along the straight line Q1Q2 and by Δ along the straight line Q3Q4 from the position Q0 which has been obtained in Step S5, is calculated as a target position of the robot movement, and the movement of the robot to the target position is executed.

In Step S8, if it is determined that the robot has not reached the end point P' of the moving cycle, the processing is returned to Step S4 to repeat Steps S4–S8. Accordingly, for example, in the first moving cycle (to form the first layer), the path a is realized. When the robot reaches the end point (corresponding to the taught point P') of the path a, the processing proceeds from Step S8 to Step S9 to increase the counter value i by "1". In Step S10, if it is confirmed that i does not exceed the number N (=6) of the moving cycles (the total number of welding layers), the processing is returned to Step S2.

Subsequently, with the counter value i increased by "1", the processing of Steps S2–S10 is repeated. For example, at Step S6 in the second moving cycle, Δx=2Δ and Δy=Δ are read to realize the path b. Likewise, under the condition that i=3, 4, 5 and 6, the paths c, d, e and f are successively realized. Since these paths a–f are calculated one after another based on the position Q0 as the starting point for shifting (as the reference of path modification), which is determined by the sensing of the laser sensor for the individual workpieces W1 and Q2, a stable accuracy of multi-layer welding is obtained even if the positioning accuracy of the workpieces W1 and W2 are not sufficiently high.

In the foregoing embodiment, the fillet multi-layer welding is described by way of illustrative example. However, the scope of technical concept of the invention should not be limited to the illustrated example. For example, as long as a path-modification reference position (Q0) is detected by a laser sensor, it is possible to apply the invention to the sealing operation (by applying sealing material) of workpieces, an ordinary painting operation, etc.

According to the present invention, it is possible to give a certain degree of freedom to the processing of obtaining a target position of robot movement based on the output of the laser sensor and to make a selection or designation corresponding to the degree of freedom by the operation program to determine the target position of robot movement. Thus the operativity of a robot system of the laser sensor carrying type is remarkably Improved.

The method of the present invention is particularly useful when applied to a multi-layer welding robot. The multi-layer welding can be performed by parallelly shifting the robot moving path by a predetermined amount in each moving cycle for each welding layer, even if the accuracy of positioning the workpieces is low.

What is claimed is:

1. A method of controlling a robot by consecutively modifying a taught path designated by an operation program, using an output from a laser sensor which has a sensing area in the vicinity of and in a moving direction of a tool mounted on the robot, said method comprising the steps of:

(a) obtaining data representing a position of a workpiece by said laser sensor during a playback operation of the operation program to operate the robot;

(b) calculating a reference position for determining a target position for the robot movement based on said data obtained in said step (a);

(c) determining a shift direction and a shift amount with respect to said reference position in accordance with a position shift pattern designated by the operation program;

(d) calculating the target position by shifting said reference position in said shift direction determined in said step (c) and by said shift amount determined in said step (c); and (e) modifying said taught path based on said target position determined in said step (d), wherein said steps (a)–(e) are periodically executed.

2. A robot controlling method according to claim 1, wherein said step (c) includes a step of reading data stored in one position shift pattern register, designated by the operation program, of a plurality of position shift pattern registers for storing said shift direction and shift amount with respect to said reference position.

3. A method of controlling a welding robot for performing multi-layer welding on a workpiece by repeatedly executing a moving cycle of a welding torch mounted on the welding robot while consecutively modifying a taught path designated by an operation program, using an output from a laser sensor which has a sensing area in the vicinity of and in a moving direction of the welding torch, said method comprising the steps of:

(a) obtaining data representing a position of the workpiece by said laser sensor during the playback operation of the operation program to operate the robot;

(b) calculating a reference position for determining a target position of the robot movement based on said data obtained in said step (a);

(c) determining a shift direction and a shift amount with respect to said reference position in accordance with a position shift pattern designated by the operation program;

(d) calculating the target position by shifting said reference position in said shift direction determined by said step (c) and by said shift amount determined in said step (c); and (e) modifying said taught path based on said target position determined in said step (d), wherein said steps (a)–(e) are periodically executed and said step (c) includes a step of reading data stored in one position shift pattern register, designated by the operation program, of a plurality of position shift pattern registers for storing said shift direction and shift amount with respect to said reference position, in dependence upon the current moving cycle of the welding torch for the corresponding layer of the multi-layer welding.

4. A method of controlling a welding robot for performing multi-layer welding on a workpiece by repeatedly executing a moving cycle of a welding torch mounted on the welding robot while consecutively modifying a taught path designated by an operation program, said method comprising the steps of:

(a) determining positions of first and second workpieces by irradiating light beams from a laser sensor in a vicinity of and in a moving direction of the welding torch;

(b) determining a reference position based on the positions determined in said step (a), wherein the reference position is a position of a corner line on a cross section of the first and second workpieces;

(c) determining a shift direction and a shift amount relative to said reference position in accordance with a preset position shift pattern designated by the operation program;

(d) determining a target position of the robot movement by shifting the reference position based upon the shift direction and shift amount;

(e) modifying the taught path based upon said target position determined in said step (d); and (f) repeating said steps (a)–(e) for a plurality of moving cycles of the welding torch, wherein each moving cycle produces another layer of the multi-layer welding.

5. A method as claimed in claim 4, wherein said (b) further comprises the steps of:
- designating a first set of two points based upon the position of the first workpiece;
- designating a second set of two points based upon the position of the second workpiece;
- sampling detection outputs of the laser sensor at points in time when the light beams are formed at each of the points of the first and second sets to determine light spot coordinates of each of the points of the first and second sets;
- determining three-dimensional positions of each of the points of the first and second sets based upon the light spot coordinates and date representing a position of a laser beam scanning surface determined by the robot position at each sampling time;
- determining equations for straight lines between the two points of each set; and
- determining the reference point as an intersection between the two straight lines.

6. A method as claimed 5, wherein said step (c) further comprises retrieving a distinct shift direction and shift amount for each moving cycle of the welding torch, wherein the shift directions and shift amounts are determined based upon a coordinate system using the two straight lines as axes.

7. A method as claimed in claim 6, wherein the shift directions are only in a direction parallel to a first one of the two straight lines, parallel to a second one of the two straight lines, and at a 45 degree angle to the two straight lines.

8. A method of controlling a welding robot for performing multi-layer welding on a workpiece by repeatedly executing a moving cycle of a welding torch mounted on the welding robot while consecutively modifying a taught path designated by an operation program, said method comprising the steps of:

(a) determining a position of a workpiece by irradiating light beams from a laser sensor in a vicinity of and in a moving direction of the welding torch;

(b) determining a reference position based on the position determined in said step (a), wherein the reference position is a welding-line position of the welding torch;

(c) determining a shift direction and a shift amount relative to said reference position in accordance with a preset position shift pattern designated by the operation program;

(d) determining a target position of the robot movement by shifting the reference position based upon the shift direction and shift amount; and (e) modifying the taught path based upon said target position determined in said step (d); and (f) repeating said steps (a)–(e) for a plurality of moving cycles of the welding torch, wherein each moving cycle produces another layer of the multi-layer welding.

9. A sensor for controlling a welding robot which performs multi-layer welding on a workpiece by repeatedly executing a moving cycle of a welding torch mounted on the welding robot while consecutively modifying a taught path designated by an operation program, the sensor comprising:
- a laser generator to produce laser light;
- a pivotal mirror which pivots to scan the laser light on the workpiece;
- an optical system to receive and focus the laser light reflected from the workpiece;
- a light receiving element to receive the focused laser light passing through the optical system;
- a controller to control the laser generator and the pivotal mirror;
- wherein a coordinate position (X,Y) at which the laser light strikes and the workpiece is determined by the following equations:

$$X = xa \cdot [(L1 - L0) \cdot \tan\theta + D]/(xa + L2 \cdot \tan\theta),$$

$$Y = L2 \cdot \{L0 \cdot \tan\theta + xa \cdot (L1/L2) - D\}/(xa + 2 \cdot \tan\theta =$$

$$[L1 \cdot xa = L2 \cdot (L0 \cdot \tan\theta - D)]/(xa + L2 \cdot \tan\theta);$$

wherein L1 is a distance from an origin of the sensor to a center of the optical system, L2 is a distance from the center of the optical system to a center point of the light receiving element, D is a distance from the origin to a pivot point of the pivotal mirror in the X axis direction, L0 is a distance from the origin to the pivot point in the Y axis direction, θ is an angle between the laser light reflected from the workpiece and a Y-axis, and xa is a light receiving position on the light receiving element in the X axis direction.

10. A sensor as claimed in claim 9, wherein the light receiving element is a charge coupled device and a scanning cycle of the charge coupled device is shorter than a scanning cycle of the pivotal mirror.

11. A sensor as claimed in claim 10, wherein the charge coupled device includes cells, and an output of the charge coupled device is determined in terms of cell position of maximum output.

* * * * *